(12) United States Patent
Anadollu (10) Patent No.: US 12,512,995 B2
(45) Date of Patent: Dec. 30, 2025

(54) BLOCKCHAIN AND DIGITAL IDENTITY-BASED AUTHENTICATED INTERACTION SYSTEM AND METHOD

(71) Applicant: OREMA YAZILIM ANONİM SİRKETİ, Antalya (TR)

(72) Inventor: Sertaç Anadollu, Antalya (TR)

( * ) Notice: Subject to any disclaimer, the term of this patent is extended or adjusted under 35 U.S.C. 154(b) by 34 days.

(21) Appl. No.: 18/730,546

(22) PCT Filed: May 23, 2023

(86) PCT No.: PCT/TR2023/050462
§ 371 (c)(1),
(2) Date: Jul. 19, 2024

(87) PCT Pub. No.: WO2024/112282
PCT Pub. Date: May 30, 2024

(65) Prior Publication Data
US 2025/0168004 A1 May 22, 2025

(51) Int. Cl.
*H04L 9/32* (2006.01)
*G06F 21/64* (2013.01)
*H04L 9/00* (2022.01)

(52) U.S. Cl.
CPC ............ *H04L 9/3221* (2013.01); *G06F 21/64* (2013.01); *H04L 9/3218* (2013.01); *H04L 9/50* (2022.05)

(58) Field of Classification Search
CPC ....... H04L 9/3221; H04L 9/3218; H04L 9/50; G06F 21/64
See application file for complete search history.

(56) References Cited

U.S. PATENT DOCUMENTS

| | | | |
|---|---|---|---|
| 11,323,885 B1* | 5/2022 | Shoemaker | H04W 12/08 |
| 2020/0076798 A1* | 3/2020 | Lidsky | H04L 9/3228 |
| 2021/0119785 A1* | 4/2021 | Ben-Reuven | H04L 9/3239 |
| 2021/0165905 A1* | 6/2021 | Bertin | G06F 16/1824 |
| 2024/0080191 A1* | 3/2024 | Vinayagamurthy | H04L 9/3247 |

FOREIGN PATENT DOCUMENTS

| TR | 2022/004556 A2 | 4/2022 |
|---|---|---|
| WO | 2021127575 A1 | 6/2021 |

OTHER PUBLICATIONS

International Search Report for corresponding PCT/TR2023/050462 dated Oct. 11, 2023.
Written Opinion of the International Searching Authority for corresponding PCT/TR2023/050462 dated Oct. 11, 2023.

* cited by examiner

*Primary Examiner* — Cheng-Feng Huang
(74) *Attorney, Agent, or Firm* — Egbert, McDaniel & Swartz, PLLC (57) ABSTRACT

Disclosed is a blockchain and digital identity-based authenticated interaction system and method that enables authentication between at least one authenticating actor and at least one authenticated actor.

23 Claims, 10 Drawing Sheets

BLOCKCHAIN AND DIGITAL IDENTITY-BASED AUTHENTICATED INTERACTION SYSTEM AND METHOD

TECHNICAL FIELD

The invention relates to a blockchain and digital identity-based authenticated interaction system and method that enables authentication between at least two actors, at least one authenticating actor and at least one authenticated actor, and between said actors.

STATE OF THE ART

Authentication is process of confirming the desired users. Authorization is process of allowing users where to login and what information to access. "Authentication and Authorization" is an interaction in which the actors involved in the process ("Authenticated Actor" and "Authenticating Actor") agree on the completion of the relevant authentication procedure through digitally formatted, stored, and submitted information. It is understood that in the relevant interaction environment, the parties (i.e., actors) submit the "Authentication and Authorization" requirements to each other with their digital identities and this information is authenticated.

There are many interaction systems available today. The state of the art uses a single sign on system in digital spaces. "AirDrop" (a specialized file sharing service owned by the Apple ecosystem) is used in the iOS environment and "Near field communication" in the Android environment. The main benefit of a single sign-on system is that the authenticated user does not need to re-authenticate again and again on the digital channels of the relevant service provider. The main solutions integrating this architecture are "Okta", "Rippling", "JumpCloud", "Microsoft Azure Active Directory", "LastPass", "Duo Security", "Keeper Password Manager" and "OneLogin". The single sign-on system has problems in terms of security due to the fact that users' information is stored in a single location, the execution cost is high, and it only works on the servers and configuration of the relevant service provider. There are no enhancements to the confidentiality of users' personal information in the single sign-on system. In the AirDrop system, there is a network provided over bluetooth and WiFi that makes it possible to share information and documents between devices with iOS operating systems. In this system, which is only valid between iOS-based systems, the content to be shared is limited and the process is operated through a centralized architecture. In the Share Nearby system, file and application sharing is made possible only between Android devices, and this solution realizes a bluetooth and wifi based operation. During the interaction of the parties involved, the interaction is controlled by centralized Google services.

The state of the art does not perform authentication and authorization by means of zero proof of knowledge. In addition, a CRM (Customer Relationship Management) service is run on the digital idendify information of the users and the data is shared with third parties. In the state of the art, it is not possible to access the services offered in any physical medium, digital medium and in the environment where interaction and interaction between users (between actors) are realized. In addition, there is no P2P (Peer to peer) interaction channel that agrees with the authentication and authorization process.

As a result of the research on the subject, application numbered TR2022/004556 has been found. The application is related to the digital management model. However, the application does not mention a system and method that enables the data owned by the user, physical medium and digital medium (actors) to be formatted under a digital identity and stored decentralised on the users' own devices and/or hardware through blockchain technology, and hat provides the authentication requirements between the authenticating actor and the authenticated actor and the interpretation of the data requested by the actors (user, physical medium and digital medium) through digital and physical triggers (physical communication module, wireless communication module) to be submitted in the authorisation processes by generating zero proof of knowledge.

Consequently, due to the above-mentioned drawbacks and the inadequacy of the existing solutions, a development in the relevant technical field has become necessary.

OBJECT OF THE INVENTION

The invention is inspired by existing situations and aims to solve the above-mentioned problems.

The main object of the invention is to format the data owned by the user, physical medium and digital medium (actors) under digital identity and store them in their own devices and/or hardware in a decentralized manner through blockchain technology, through digital and physical triggers (physical communication module) to be presented in authentication requirements and authorization processes between the authenticating actor and the authenticated actor, wireless communication module) to interpret of the data requested by the actors (user, physical medium and digital medium) and to complete the authentication and authorization process in a serverless manner by generating zero proof of knowledge.

Another object of the invention is to enable user, physical medium and digital medium interactions to be initiated through the P2P channel in authentication and authorization processes.

Another purpose of the invention is to provide authentication and authorization requirements in a serverless architecture through the application in the electronic device.

Another object of the invention is to enable the decentralized running of digital identity information and verification requirements of the user, physical medium and digital medium on blockchain technology.

Another object of the invention is to enable the parties to make the choices they need in line with the demands of the user, the physical medium and the digital medium.

In order to fulfill the above-mentioned objects, the invention is a blockchain and digital identity-based authenticated interaction system that enables authentication requirements and authorization processes between the authenticating actor and the authenticated actor to be carried out in a decentralized manner without a central server, and comprises:
- at least one electronic device configured to run at least one application thereon,.
- at least two actors, including at least one authenticating actor and at least one authenticated actor, and one server belonging to each actor, which stores digital identity information and blockchain data of each actor,
- a trigger
    - which is embedded in actors, which transmits data from the system in which the trigger resides, and
    - which initiates the authentication and authorization interaction between actors, generates zero-knowledge proofs, and which reads the identity information data on the blockchain presented to the counter actor or the identity information data on the blockchain presented from the counter actor, an application
which is running on control unit located in the electronic device,
which receive signals transmitted by the trigger,
which reads the received signals, interprets the data carried on the signal and
enables the authentication and authorization interaction between actors to be completed through zero-knowledge proofs generated.

In order to fulfill the aforementioned purposes, the invention is a blockchain and digital identity-based authenticated interaction method that enables authentication requirements and authorization processes between the authenticating actor and the authenticated actor to be carried out in a decentralized manner and without a central server, with following process steps:

the authenticating actor communicates with the authenticated actor to carry out the authentication and authorization process,
reading required data from the trigger associated with the authenticated actor by the authenticating actor,
navigating to the blockchain address in the read data of the authenticated actor,
the authenticating actor interprets the authentication requirements based on the blockchain address,
generating of authentication proof by the authenticating actor according to the interpreted authentication requirements,
transmitting the generated proof through blockchain to the blockchain node of the authenticated actor, and
authentication and completion of the authorization process.

The structural and characteristic features and all advantages of the invention will be more clearly understood by means of the figures given below and the detailed description provided with references for the figures, and therefore, the evaluation should be made by considering the figures and detailed description below.

FIGURES TO HELP UNDERSTAND THE INVENTION

DESCRIPTION OF PART REFERENCES

1. User
2. Physical medium
3. Digital medium
4. Blockchain
5. Wireless communication module
6. Physical communication module
7. Authenticating actor
8. Authenticated actor
9. Application
10. Electronic device

DETAILED DESCRIPTION OF THE INVENTION

In this detailed description, the preferred embodiments of the inventive blockchain (4) and digital identity-based authenticated interaction system and method are described only for a better understanding of the subject matter.

Figure 1:
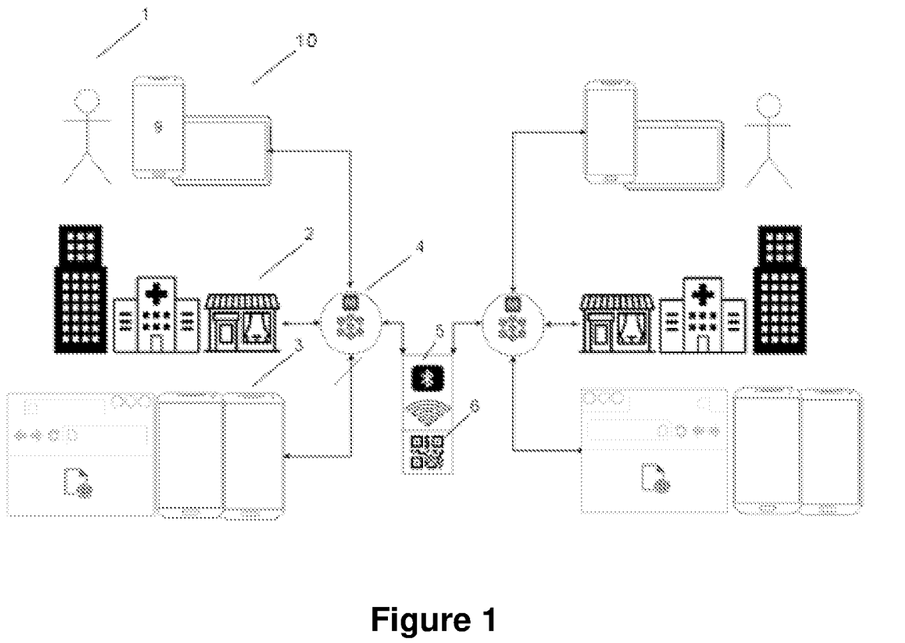
FIG. 1 is a representative illustration of the blockchain and digital identity-based authenticated interaction system.

Blockchain (4) and digital identity-based authenticated interaction system comprises blockchain technology (4) and application (9). Blockchain (4) and digital identity-based authenticated interaction system comprises actors. These actors include the user (1), the physical medium (2) and the digital medium (3). In the blockchain (4) and digital identity-based authenticated interaction system, there is an authenticating actor (7) and an authenticated actor (8). There are also triggers used on the system. These triggers include a wireless communication module (5) and a physical communication module (6).

Blockchain (4) and digital identity-based authenticated interaction system and method generally enable actors (user (1), physical medium (2) and digital medium (3)) to securely authenticate and interact with each other without involving a central server. While there is at least one actor in the blockchain (4) and digital identity-based authenticated interaction system, numerous actors can interact with each other in alternative configurations. Users (1) submit their personal information or verify the information submitted by the other party during the authentication and authorization process. Personal information includes all information related to users (1), such as identity information. Users (1) use an electronic device for authentication and to interact with other users (1) or actors. In alternative embodiments of the invention, all smart devices such as phones, tablets, computers, smart watches, smart televisions can be used as the electronic device (10). An application (9) is run by means of the control unit in the electronic device (10).

Physical mediums (2) contain an identity information. Examples of physical mediums (2) include schools, government offices, work environments, shopping malls, cars, shuttles, and hospitals. The identity information is provided to the physical mediums (2) by means of a wireless communication module (5) and/or a physical communication module (6). Physical mediums (2) are optionally connected to wireless communication modules (5) and/or physical communication modules (6). WiFi module, bluetooth module, RF modules, Zigbee module and GSM module can be used as examples of wireless communication modules (5) in alternative embodiments of the invention. The wireless communication module (5) plays a triggering role between the actors in the authentication and authorization processes. As an example of physical communication modules (6), physical elements such as barcodes and QR codes can be used in alternative embodiments of the invention. The physical communication module (6) provides or triggers information in the authentication or authorization processes. In alternative embodiments of the invention, the physical communication module (6) is a type of matrix barcode that can be scanned by machines. When the necessary two-dimensional interpretation integration is added, which can be embedded with information, it can be read by means of cameras in electronic devices (10). Physical mediums (2) broadcast their triggers for the authentication and authorization process required by the legal entity they hold through the wireless communication module (5) and/or physical communication module (6) placed in their environment. Each physical medium (2) is assigned a digital identity through blockchain (4). The data of all physical mediums (2) blockchain (4) are different from each other and contain their own data. Physical mediums (2) publish their digital identities via blockchain (4) to users (1) via wireless communication module (5) and/or physical communication module (6) or submit verification requests to other identity providers arriving at the physical medium (2).

Digital mediums (3) contain an identity information. Examples of digital medium (3) include web interfaces, applications, software running on smart devices. The identity information of the digital medium (3) is stored on the server that provides service to the relevant digital medium (3). Each digital medium (3) has different identity information. Digital channels (3) are assigned identity information through blockchain (4). Digital medium (3) presents their digital identity through triggers or read the presented data and have digital transmitters and receivers (devices with hardware and/or software capable of emitting/reading/interpreting/generating signals). The digital medium (3) can transmit or read the authentication request through the signal transmitters, receivers or display interfaces (the interface through which the QR code is displayed) of the electronic device (10) on which it operates.

In the alternative embodiment of the invention, the Mina protocol blockchain (4) is used as the blockchain (4). Blockchain (4) is the medium through which digital identities are authenticated. Mina protocol blockchain (4) is a decentralized and light blockchain (4) network.

Figure 2:
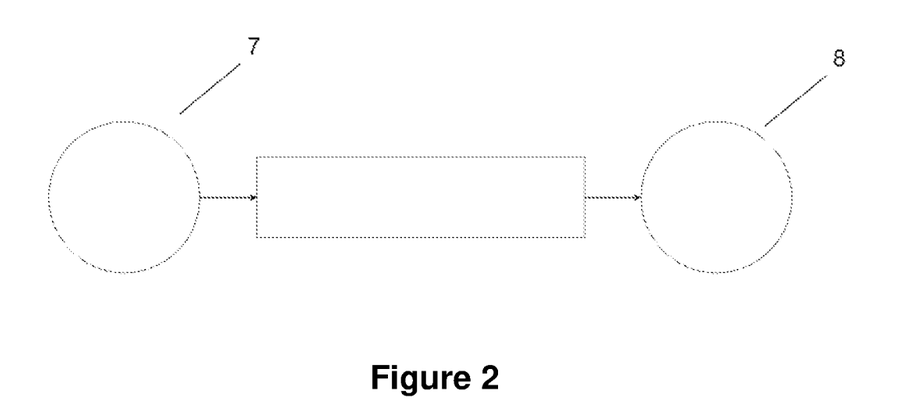
FIG. 2 is a representative diagram of the authenticating actor and the authenticated actor.

The authenticating actor (7) is the party that publishes authentication and authorization requirements to the party that will interact with it and has the role of taking the decision based on the proof communicated. The authenticating actor (7) has the role in the authentication and authorization processes, where the proof is submitted, and the verification decision is taken. From the authenticating actor (7) to the authenticated actor (8), it has the role of communicating authentication and authorization requirements with defined triggers. Authenticated actor (8) may have physical medium (2), digital medium (3) and users (1). The authenticated actor (8) presents their identity by producing proof in the authentication and authorization processes and becomes a candidate for verification.

The user (1), the physical space (2) and the digital medium (3), which are the three main actors subject to the blockchain (4) and digital identity-based authenticated interaction system and method, have a mina blockchain (4) node on themselves. The blockchains (4) owned by the user (1), physical medium (2) and digital medium (3) have two basic capabilities. The first capability is the ability of actors to store their digital identities on the respective blockchain (4). The second capability is that the user (1), the physical medium (2) and the digital medium (3) present authentication requirements to other actors requesting interaction with them and, if the correct proof is produced, they perform the verification. The blockchain (4) of the user (1), physical medium (2) and digital medium (3) can initiate "Authentication and Authorization" processes through various triggers according to the process and context. The triggers used in alternative embodiments of the invention are listed below.

a. Triggering

Two different basic triggers are used for the user (1), the physical medium (2) and the digital medium (3) to present verification requirements to other parties in the "Authentication and Authorization" process.

1. Triggering via Physical Communication Module (6) (QR Code-Based Triggering)

They are the triggers that allow the party initiating the interaction to visit the blockchain (4) address of the authenticating actor (7) by scanning the QR code presented to them. It interprets the actor (user (1), who needs to present his/her identity, physical space (2) and digital medium (3)) and for which information he/she needs to produce proof by going to the relevant address.

2. Triggering via Wireless Communication Module (5) (Bluetooth and WiFi Based Triggering)

The Bluetooth signal emitted from the physical device (Computer, Mobile Phone, Tablet, etc.) where the service is carried out and the information carried by the service provider with this signal transmit the blockchain (4) address of the actor who will perform the authentication. Alternatively, a bluetooth signal transmitter (Bluetooth Low Energy Beacon etc.) placed in the physical medium transmits the blockchain (4) address of the actor who will authenticate with the bluetooth 4.0 & 5.0 protocol. The actor who needs to present his identity (the authenticated actor (8)) then interacts with the authenticating actor (7) to interpret what information he needs to provide.

It is the trigger that provides access to the blockchain (4) environment where the interacting party will obtain the information it needs to provide for verification. It is a form of wireless signal-based triggering presented in the standards of the IEEE 802.X wireless sub-protocols in the environment.

b. Source of Verification Proof

An authentication request is triggered through one of the two methods mentioned above. The triggered request provides access to the area where the actors' digital identities are stored. The actors' digital identities are stored in their own Mina blockchain (4) nodes. The digital identity blockchain (4) node of each actor (user (1), physical medium (2) and digital medium (3)) both stores the information of the relevant party and presents and verifies the requirements to the parties requesting interaction.

An Alternative Working Principle of the Invention

In a blockchain (4) and digital identity-based authenticated interaction system, there are three main types of actors: users (1), physical mediums (2) and digital medium (3). Each actor has its own digital identity and authentication requirement definition.

If the actor is a user (1), their digital identity information is stored on their mobile device. If the actor is a digital medium (3), this information is stored on the relevant digital medium's (3) own storage servers. If the actor is a physical medium (2), it is stored on the servers of the relevant institution/organization. The actors' authentication requirement definitions are defined by smart contracts on their own mined blockchains (4) nodes. These blockchain (4) nodes are stored where the actors' digital identities are stored (mobile device if the actor is a user (1), digital medium (3) or physical medium (2)).

Figure 11:
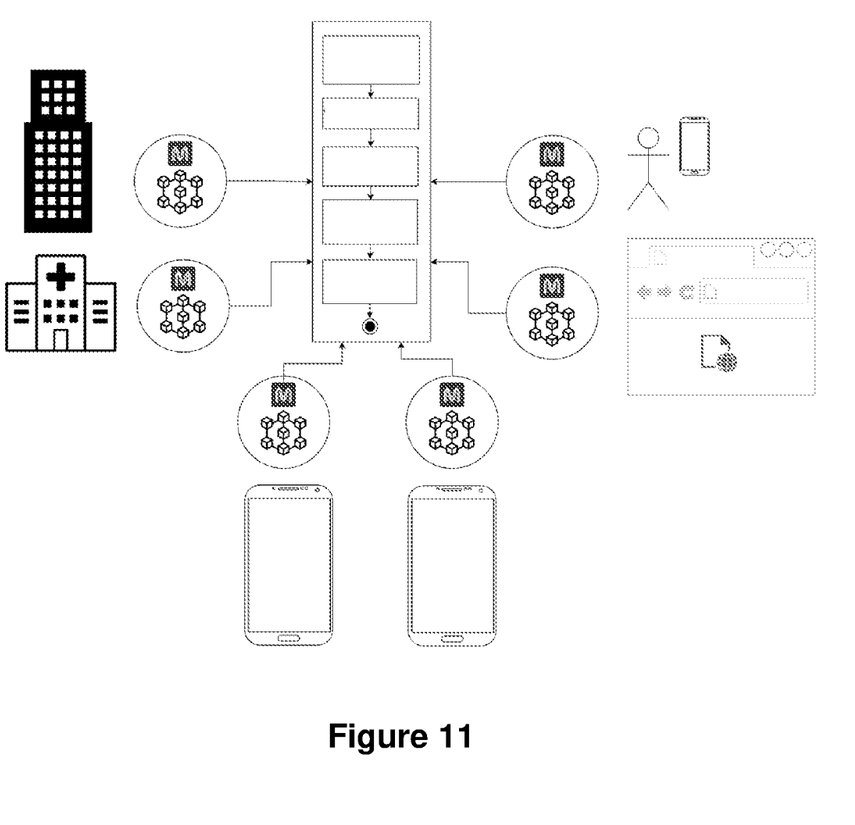
FIG. 11 is a representative illustration of the blockchain and digital identity-based authenticated interaction method.

The interaction of actors starts through triggers. Triggers have the capacity to carry a certain amount of data thanks to their communication protocols. Here, the trigger can be a wireless protocol meeting Bluetooth 4.0 & 5.0, IEEE 802.X standard (Wi-Fi, etc.) or a QR code. The triggers carry the blockchain (4) address of the actor to authenticate. The party receiving the corresponding signal and data understands which blockchain (4) address to visit. The party to be authenticated visits the blockchain (4) address of the actor requiring verification and interprets what information is required. This actor in the authenticated role then visits its own blockchain (4) node to generate the required proof. The generated proof is transferred to the actor in the verifier role via Bluetooth 4.0 & 5.0, IEEE 802.X standard wireless networks (Wi-Fi, etc.), QR Code or HTTP/HTTPS Protocol. The actor certifying the relevant proof authorizes the blockchain (4) address of the actor presenting his/her identity and the interaction starts.

Figure 3:
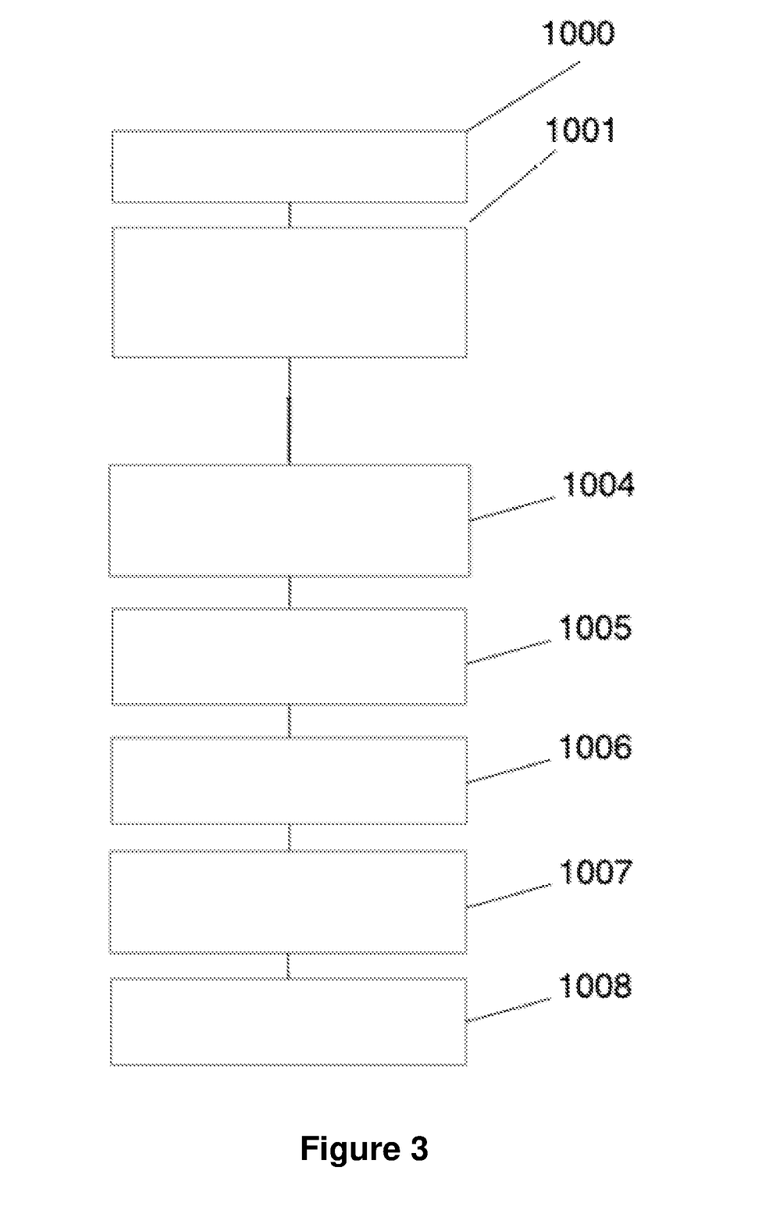
FIG. 3 is a representative illustration of the scenario of the user entering the physical medium.

A user (1) with a digital identity storage mobile application (9) enters a physical medium (2). The physical medium (2) is the entrance area of a physical medium such as a hospital, café, school, etc. In the relevant physical medium (2), there is a wireless communication module (5) and/or a trigger as a physical communication module (6). The user (1) reads the signal emitted by the wireless communication module (5) in the environment through the digital identity storage mobile application (9). The data carried by the read signal is interpreted. In addition, the camera is accessed through the user's (1) digital identity storage mobile application (9) and the QR code data placed in the physical medium (2) is read. With the data read from the triggers, the routing address is accessed to get the Mina Blockchain (4) address of the physical medium (2). Redirection to the relevant address is realized. The information requested by the physical medium (2) for authentication via Mina Blockchain (4) is interpreted. The necessary authentication and authorization proof is generated through the Mina Blockchain (4), which hosts the digital identity information of the user (1). The generated proof is transmitted to the authentication service on the service provider's Blockchain (4) node via the user's (1) digital identity storage mobile application (9). The user (1), whose authentication is completed on the blockchain (4) node of the physical medium (2), becomes able to interact with the processes offered on the blockchain (4) node of the physical medium (2) with his/her blockchain (4) address. Thus, the authentication and authorization process are completed.

Figure 4:
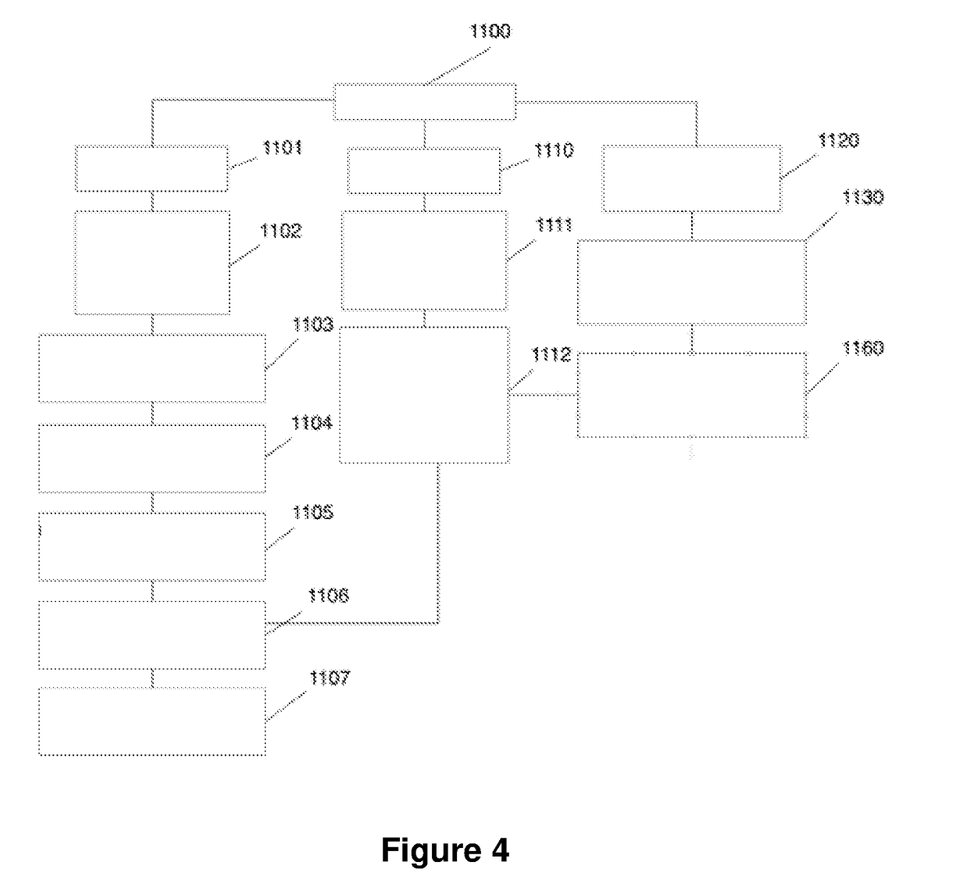
FIG. 4 is a representative illustration of the scenario of the user's entry into the digital medium.

A user (1) with a digital identity storage mobile application (9) logs in to the digital medium (3) listed below. (It can be an application (9) on the user's (1) mobile device, a browser on the user's (1) mobile device, and a Web environment accessed via a desktop/laptop device.) User (1) with a digital identity storage mobile application (9) opens the application (9). The application (9), which the user (1) has logged in to, presents an interaction interface that enables the service provider to redirect the user to its Mina blockchain (4) verification address to perform the "authentication and authorization" process. The user (1) interacting with the relevant interface is redirected to the service provider's identity blockchain (4) address. The user's (1) digital identity storage mobile application (9) interprets the authentication and authorization requirements on the service provider's blockchain (4) node. The authentication requirements are communicated to the user's (1) digital identity storage mobile application (9) via deeplinking. According to the requirements of the digital medium (3), the required authentication proof is generated and transmitted to the authenticator actor (7). In the blockchain (4) node of the service provider mobile application (9), the proof of the user (1) is authenticated. The user (1) becomes able to interact with the processes offered on the service provider's blockchain (4).

Figure 5:
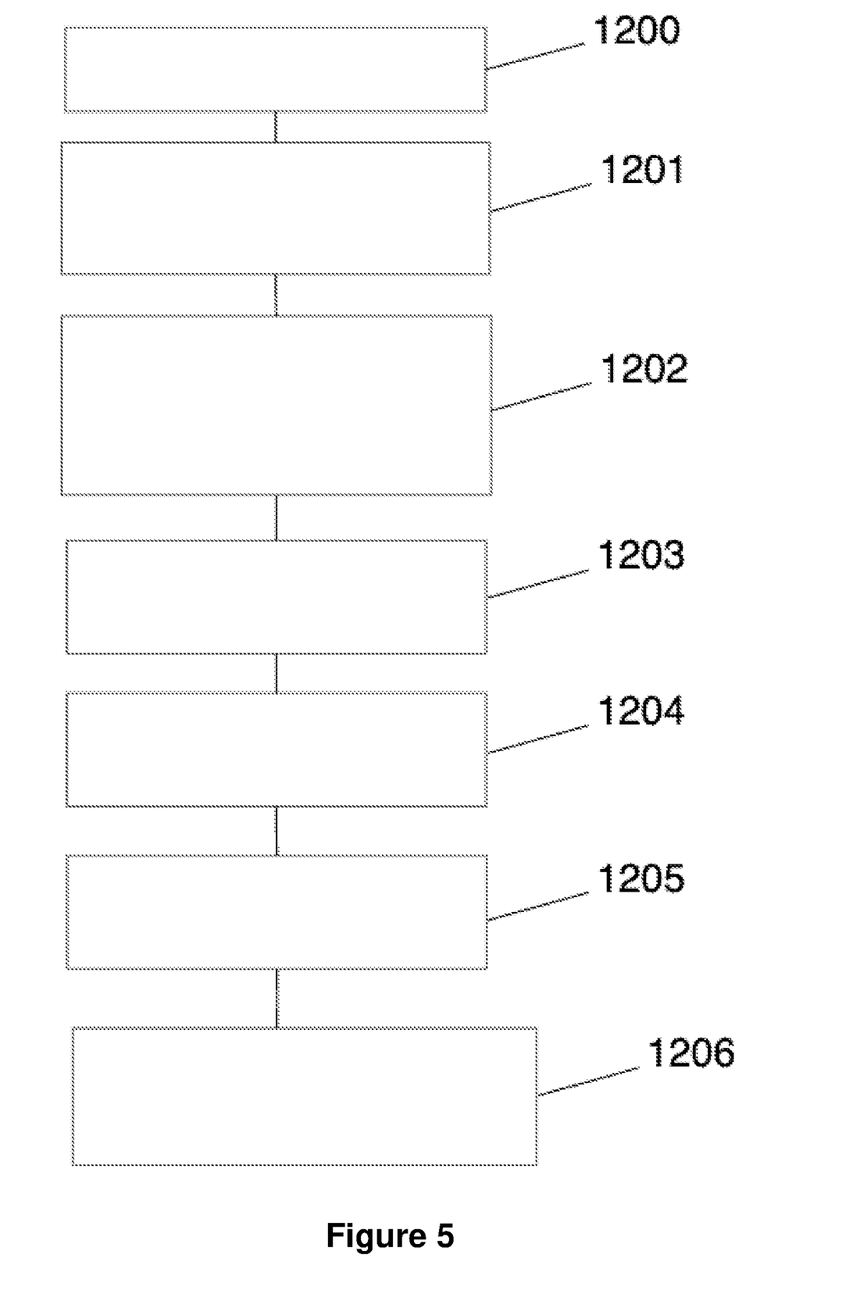
FIG. 5 is a representative illustration of the interaction scenario of the user with the user.
Figure 6:
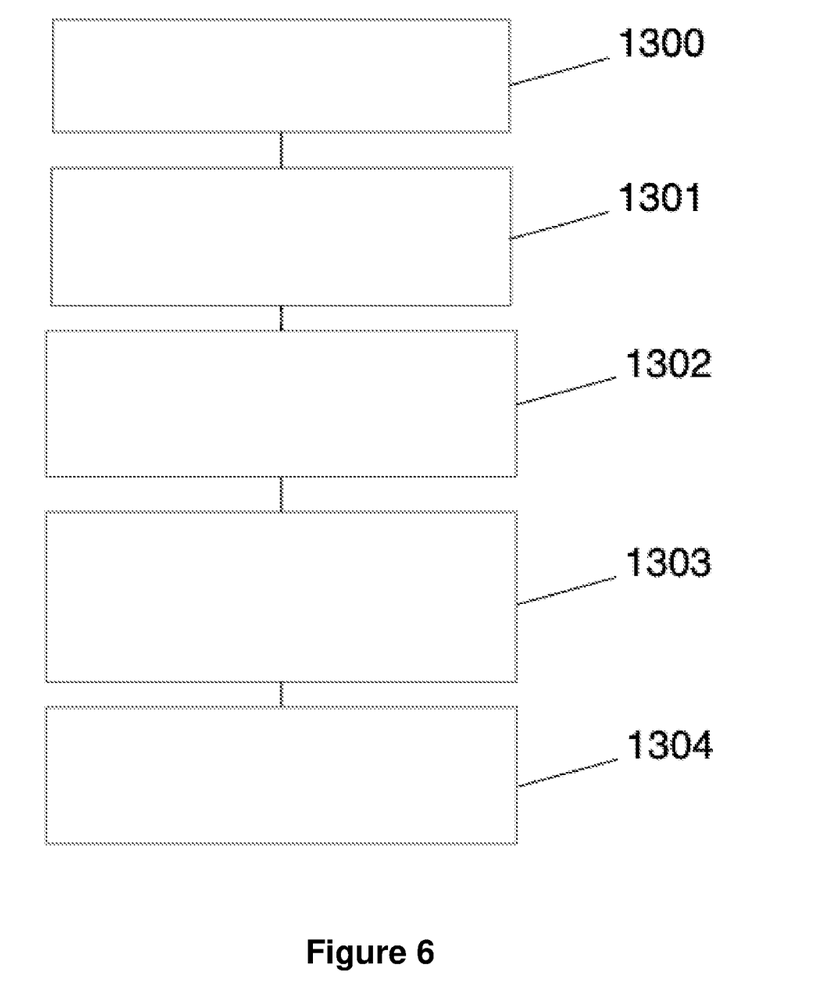
FIG. 6 is a representative illustration of the interaction scenario of the digital medium with the user.

A user (1) with a digital identity storage mobile app (9) and a user (1) with the same app (9) share a physical medium (2). One of the parties takes the role of the authenticating actor (7) when activating Bluetooth, Hotspot Wi-Fi or QR code services. Here, it is possible for the user (1) to activate the relevant role through the mobile application (9). With the data transferred from Bluetooth, Hotspot Wi-Fi or QR code services, the blockchain (4) address of the authenticator actor (7) is presented. The user (1), who will present his/her identity, navigates to the relevant blockchain address (4) via the transmitted signals or the scanned QR code and interprets the authentication authorization requirements. The authenticating user (1) generates the proof required for verification from the blockchain (4) node where his/her digital identity is stored. The generated proof is shared with the blockchain (4) node of the authenticating actor (7) via HTTP/HTTPS, bluetooth or QR code. The user (1), who is the authenticating actor (7), confirms the verification with the proof transmitted to him and completes the necessary authentication and authorization process through the blockchain (4) address of the authenticated person.

Figure 7:
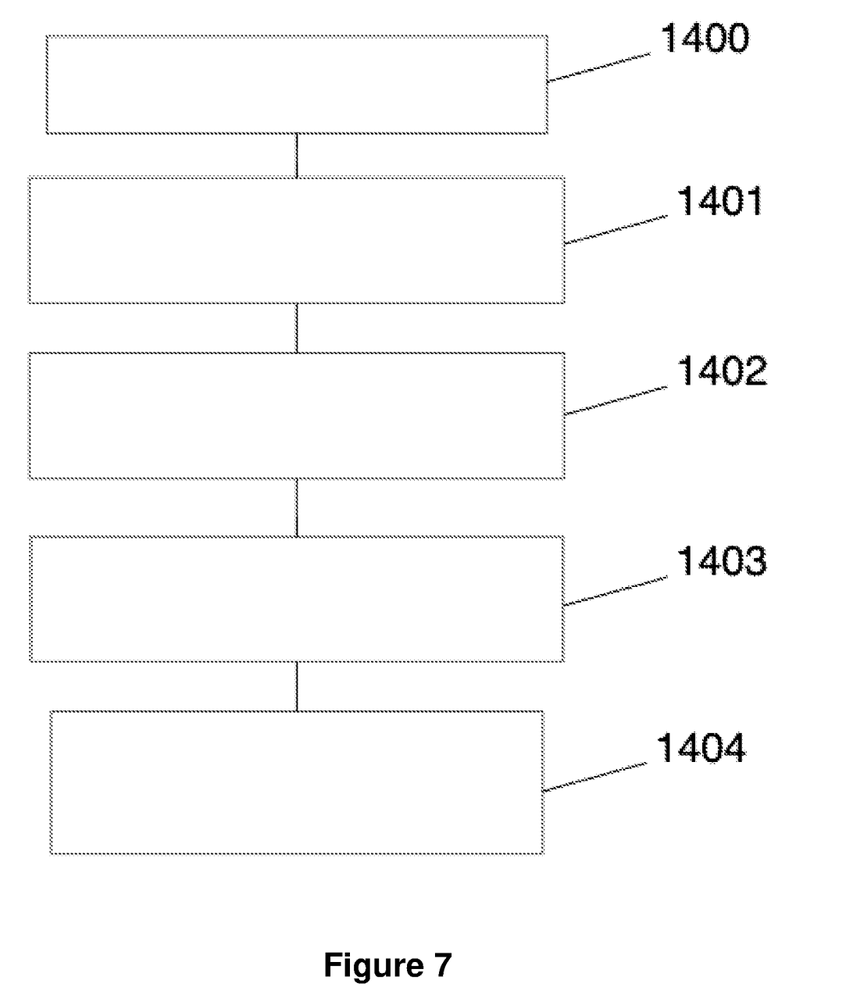
FIG. 7 is a representative illustration of the interaction scenario of the digital medium with the digital medium.

The user (1), who is the authenticating actor (7), confirms the verification with the proof transmitted to him and completes the necessary authentication and authorization process through the blockchain (4) address of the authenticated person. The digital medium (3) initiating the interaction request interprets and formats the incoming authentication requirements through the blockchain (4) node of the other digital medium (3). The digital medium (3) initiating the interaction request generates proof according to the requirements of the authentication request. The generated proof is authenticated on the blockchain (4) of the authenticating actor (7). The authenticated identity of the relevant digital medium (3) is interpreted together with the blockchain address (4).

Figure 8:
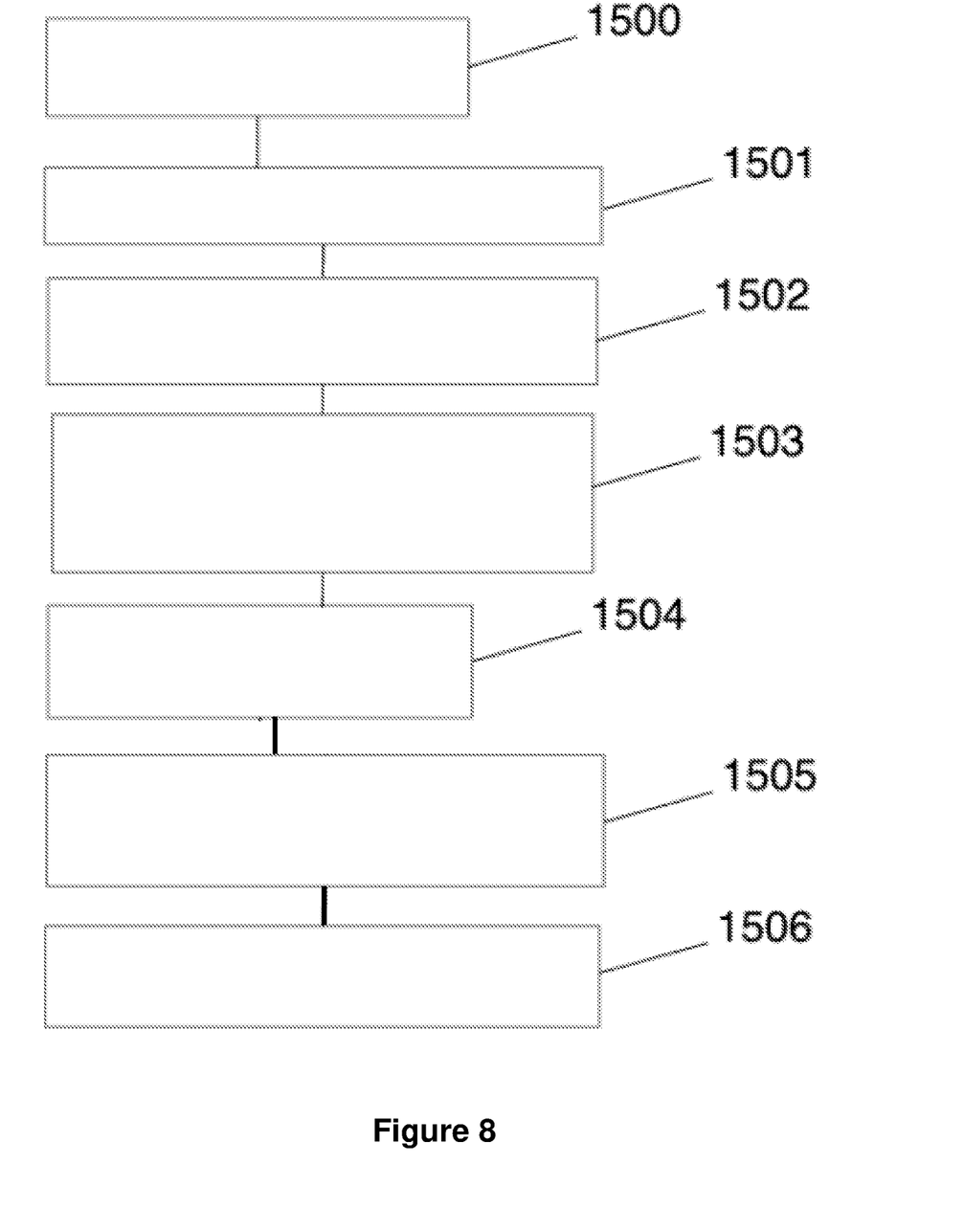
FIG. 8 is a representative illustration of the interaction scenario of the digital medium with physical medium.
Figure 9:
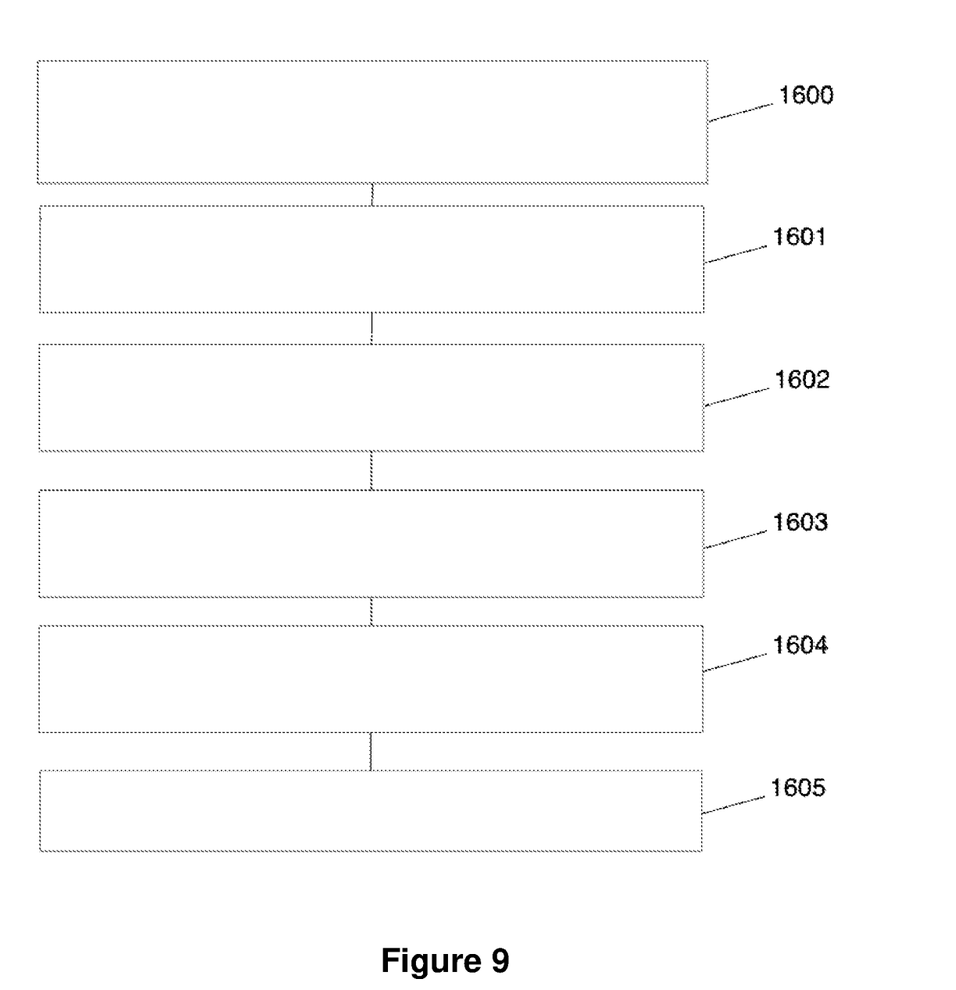
FIG. 9 is a representative illustration of the interaction scenario of the physical medium with the user.

A digital medium (3) accesses the other party from the digital environment in which it is compiled to connect to the blockchain (4) owned by a physical medium (2). The relevant physical medium (2) evaluates the interaction request and decides to approve/reject it. If the relevant physical medium (2) approves, the blockchain (4) address of the relevant physical medium (2) is transmitted to the digital medium (3) via http/https protocols. The digital medium (3) interprets the verification requirements of the physical medium (2). The verification proof required for the relevant requirements is generated through the blockchain (4) node of the digital medium (3). The generated proof is directed to the blockchain (4) node of the physical medium (2) where the digital authentication services are offered. The blockchain (4) address of the digital medium (3) is authenticated and authorized to interact with the physical medium (2).

Alternative Scenarios of the Invention are as Follows

User (1)—Physical Medium (2) Interaction Example Scenario

1. A user (1) with an application (9) running on an electronic device (10) enters a hospital.
2. The signal carrying the "Physical medium (2) ID" broadcast through the wireless communication module (5) located at the entrance door of the hospital interacts with the electronic device (10) of the user (1).

3. With the signal read from the user's (1) electronic device (10), the application (9) understands through which physical medium (2) is accessed and the blockchain (4) address of the physical medium (2).
4. The user's (1) mobile application (9) interprets the "Authentication and Authorization" requirements stored in the "Physical medium (2) Blockchain (4) node.
5. Proof of "Authentication and Authorization" is generated through the blockchain (4) node containing the "Digital Identity" information of the user (1) with the "Zero-Knowledge Proof" method.
6. The user's (1) proof is presented to the blockchain (4) node of the physical medium (2).
7. The physical medium (2) confirms the relevant proof.
8. The services offered to the authenticated user (1) within the hospital are listed.
9. User (1) selects the "Make an Appointment" service from the services offered to him/her.
10. The appointment booking service is processed and recorded on the hospital's servers.
11. User (1) follows his/her queue through the "Kontak" mobile application (9) platform.
12. User (1) is examined and leaves the hospital upon completion of his/her examination.

User (1)—User (1) Interaction Example Scenario
1. A user (1) with the "Kontak" mobile application (9) shares the same physical medium with another user (1) with the same application (9).
2. The party who wants to share his/her digital identity with the other user (1) opens the "Digital Identity QR Code" via the "Kontak" mobile application (9).
3. The user on the other side (1) opens the "QR Code Scanning" screen offered through the "Kontak" mobile application (9) and uses his/her camera to scan the QR code presented by his/her counterpart.
4. The authenticating user (1) is redirected to the blockchain address (4) embedded in the QR code of the user (1) presenting their identity.
5. The authenticating user (1) transmits the information requested for authentication to the blockchain (4) address of the user (1) presenting his/her identity.
6. The user (1) presenting his/her identity generates and transmits to the other party the necessary proof for the requested information.
7. The authenticating user (1) verifies the proof transmitted to him/her through the blockchain (4) and the authentication process is completed.
8. A P2P interaction channel is opened between the authenticated actor (8) and the authenticating party and communication starts.
9. One party transmits its business card to the other party through the P2P channel.

User (1)—Digital Medium (3) Interaction Example Scenario
1. The user (1) with "Kontak" Mobile application (9) visits to a website via a computer.
2. The user Clicks on the "Continue with Kontak" button on the login screen of the relevant digital medium (3).
3. The "Login with Kontak" widget opens on the interface of the digital medium (3).
4. The user (1) clicks on the "QR Code Based Login" option among the "Login via Wireless Network" and "QR Code Based Login" options offered to him/her as a login method.
5. The user (1) scans the "QR Code" presented on the interface of the digital medium (3) with the "QR Code Scan" screen presented on the "Contact Mobile Application (9)".
6. The user (1) interprets the blockchain (4) address of the digital medium (3) in the QR code scanned and is directed to the relevant address.
7. The "Kontak" mobile application (9) displays a screen to the user (1) about the authentication requirements of the relevant digital medium (3).
8. The user (1) confirms the relevant information to perform the "Authentication and Authorization" process.
9. The "Zero Proof of Knowledge" required for the verification process is generated and transmitted to the service provider's blockchain (4) node.
10. The relevant digital medium (3) verifies the generated zero-knowledge proof and authorizes the user (1).
11. The user (1) starts to interact with the digital medium (3).

Figure 10:
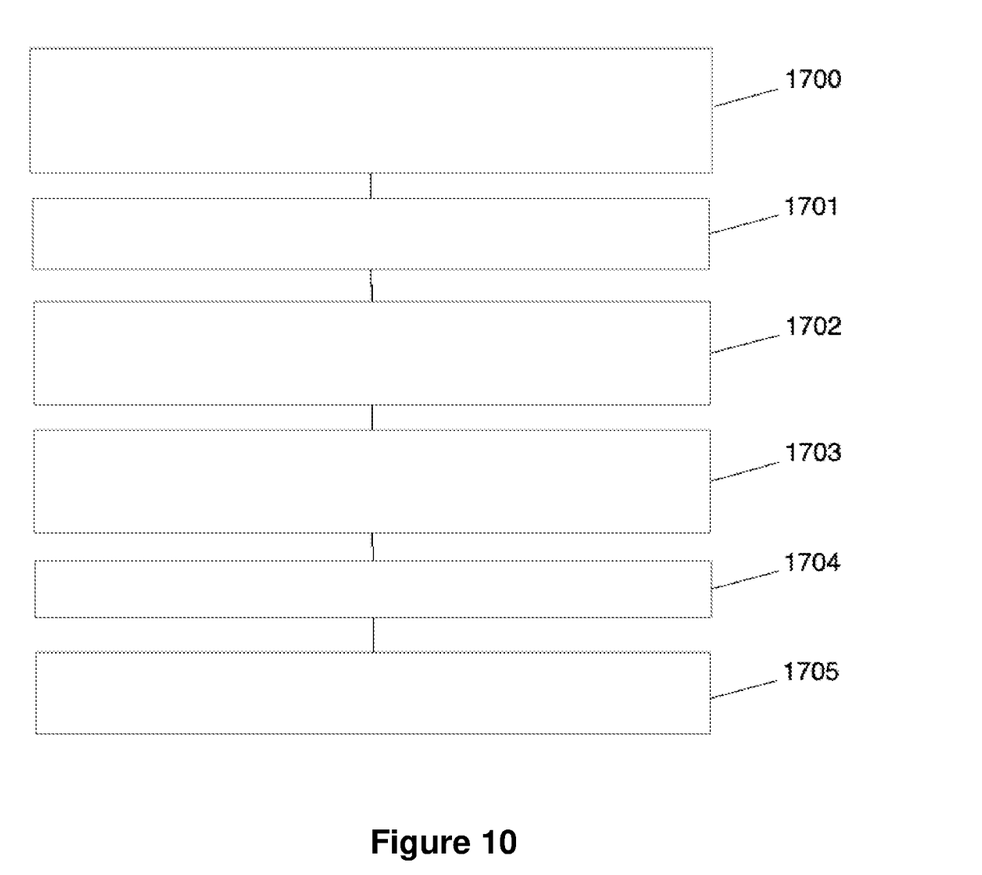
FIG. 10 is a representative illustration of the interaction scenario of the physical medium with the physical medium that is the subject of the invention.

Physical medium (2)—Physical medium (2) Interaction Example Scenario
1. A Bluetooth Low Energy Beacon (wireless communication module (5)) is installed in a school bus.
2. The school bus arrives at the entrance point of the school where there is a turnstile system.
3. At the relevant point, the electronic device capable of reading the Bluetooth signal in the control unit interprets the blockchain (4) address carried by the incoming service via Bluetooth.
4. It transmits the authentication conditions that the service must meet to the blockchain (4) on the servers of the company to which the service is connected, for querying.
5. The service generates zero proof of knowledge via the blockchain (4) on the servers of the company to which it is connected, in accordance with the authentication requirements for logging in to the school.
6. The generated proof is transmitted to the servers of the school that generated the verification request.
7. This proof generated by the service is authenticated in the "Authentication and Authorization" blockchain (4) node on the school's servers.
8. The information that the identity of the service concerned has been authenticated is transmitted to the control unit.
9. The turnstile opens and the bus enters the school.

The invention claimed is:
1. A blockchain and digital identity-based authenticated interaction system that enables authentication requirements and authorization processes between an authenticating actor and an authenticated actor to be performed in a decentralized manner and without a central server, characterised by the system comprising:
   at least one electronic device configured to run at least one application thereon;
   at least two actors, including at least one authenticating actor and at least one authenticated actor, and one server belonging to each actor, which stores digital identity information and the blockchain data of each actor;
   a trigger, which is embedded in the actors, which transmits data from the system in which the trigger resides, and which initiates the authentication and authorization interaction between the actors, generates zero-knowledge proofs, and which reads the identity information data on the blockchain presented to the counter actor or the identity information data on the blockchain presented from the counter actor;

an application which is running on a control unit located in the electronic device, which receives signals transmitted by the trigger, reads the received signals, interprets the data carried on the signal, and enables the authentication and authorization interaction between the actors to be completed through the zero-knowledge proofs generated.

2. The blockchain and digital identity-based authenticated interaction system according to claim 1, wherein the actor is a physical medium.

3. The blockchain and digital identity-based authenticated interaction system according to claim 1, wherein the actor is a digital medium.

4. The blockchain and digital identity-based authenticated interaction system according to claim 1, wherein the actor is a user.

5. The blockchain and digital identity-based authenticated interaction system according to claim 1, wherein the trigger is a wireless communication module.

6. The blockchain and digital identity based authenticated interaction system according to claim 5, wherein the wireless communication module is a bluetooth module.

7. The blockchain and digital identity-based authenticated interaction system according to claim 5, wherein the wireless communication module is a zigbee module.

8. The blockchain and digital identity-based authenticated interaction system according to claim 5, wherein the wireless communication module is a WiFi module.

9. The blockchain and digital identity based authenticated interaction system according to claim 5, wherein the wireless communication module is a GSM module.

10. The blockchain and digital identity-based authenticated interaction system according to claim 5, wherein the wireless communication module is an RF module.

11. The blockchain and digital identity-based authenticated interaction system according to claim 1, wherein the trigger is a physical communication module.

12. The blockchain and digital identity-based authenticated interaction system according to claim 11, wherein the physical communication module is a matrix barcode.

13. The blockchain and a digital identity-based authenticated interaction system according to claim 12, wherein the matrix barcode is a QR code.

14. The blockchain and digital identity-based authenticated interaction system according to claim 1, wherein the blockchain technology is a mina blockchain (4).

15. A blockchain and digital identity-based authenticated interaction method that enables authentication requirements and authorization processes between an authenticating actor and an authenticated actor to be performed in a decentralized manner and without a central server, the method comprising the following process steps:

the authenticating actor communicates with the authenticated actor to carry out an authentication and authorization process;

reading required data from a trigger associated with the authenticated actor by the authenticating actor;

navigating to a blockchain address in the read data of the authenticated actor;

the authenticating actor interprets authentication requirements based on the blockchain address;

generating of authentication proof by the authenticating actor according to the interpreted authentication requirements;;

transmitting the generated proof through the blockchain to the blockchain node of the authenticated actor; and authentication and completion of the authorization process.

16. The blockchain and digital identity-based authenticated interaction method according to claim 15, wherein if the authenticated actor is a physical medium, the method comprises the following steps:

a user enters the physical medium (1000);

a signal generated by a application on a electronic device of the user is read via the trigger in the physical medium (1001);

navigating to the blockchain address of the physical medium with the data carried in the read signal (1004);

interpreting the physical medium's authentication requirements (1005);

generating authentication proof according to the requirements (1006);

transmitting the generated proof through the user's blockchain to the blockchain node of the physical medium (1007); and authentication and completion of the authorization process (1008).

17. The blockchain and digital identity-based authenticated interaction method according to claim 15, wherein if the authenticated actor is a digital medium, the method comprises the following steps:

a user accesses the digital medium (1100);

if the digital medium is a mobile application running on a smart device (1101):

redirecting from the mobile application welcoming interface to the blockchain address owned by the application (1102), interpreting the authentication requirements of the mobile application (1103), navigating to the mobile application where the digital identity of the relevant user is kept via a deep link method (1104), navigating to the blockchain node where the user's digital identity is stored via the mobile application (1105), generating the authentication proof according to requirements (1106), and completion of authentication and authorization (1107);

if the digital medium is a web application accessed via a mobile device (1110):

following a blockchain address link offered as an authentication option from a web interface (1111), transmitting the authentication requirements of the respective service provider to the mobile application over HTTP/HTTPS protocols where the digital identity of the respective user is stored (1112), generating the authentication proof according to the requirements (1106), and completion of authentication and authorization (1107);

if the digital medium is a web application accessed via a desktop/laptop device (1120):

broadcasting the blockchain address of the service provider via the wireless communication module and/or the physical communication module on the desktop/laptop (1130), interpreting information required for the authentication (1160), transmitting the authentication requirements of the respective service provider to the mobile application over HTTP/HTTPS protocols where the digital identity of the respective user is stored (1112), generating the authentication proof according to the requirements (1106), and completion of authentication and authorization (1107).

18. The blockchain and a digital identity-based authenticated interaction method according to claim 15, wherein if the authenticating actor is a user, the method comprises the following steps:

meeting of the users in the same physical medium (1200);

one party takes on the role of the authenticating actor;

the authenticating actor provides the blockchain address via a wireless communication module and/or a physical communication module via the mobile application;

navigating the user to be authenticated to the blockchain network of the authenticated user;

the user to be authenticated generates the required proof of identity via their blockchain node (1204);

sharing the generated proof with the authenticating actor; and completion of the authentication and authorization process (1206).

19. The blockchain and digital identity-based authenticated interaction method according to claim 15, wherein if the authenticated actor and the authenticating actor are users, the method comprises the following steps:

transmitting the digital medium and/or the application available to the user via the mobile device (1300);

transmitting the transmitted digital medium to the user together with the blockchain where the digital identity information the digital medium carries is stored (1301);

generating proof from the blockchain node of the transmitted digital medium according to the authentication requirements of the user (1302);

the generated proof is authenticated via the blockchain on the user's mobile device (1303);

completion of the authentication and authorization process (1304).

20. The blockchain and a digital identity-based authenticated interaction method according to claim 15, wherein if the authenticated actor and the authenticating actor are a digital medium, the method comprises the following steps:

the digital medium attempts to interact with another digital medium (1400);

the other party generates an authentication request to the originator of the request in the interaction (1401);

the digital medium requesting the interaction generates the authentication proof from the digital identity on the blockchain node (1402);

authentication of the generated proof on the authenticating party's blockchain node (1403;; and completion of the authentication and authorization (1404).

21. The blockchain and digital identity-based authenticated interaction method according to claim 15, wherein the authenticated actor and the authenticating actor are a digital medium and a physical medium, the method comprises the following steps:

the digital medium communicates the request of the physical medium to connect to the blockchain (1500);

evaluating the request for interaction (1501);

the digital medium navigates to the blockchain address of the physical medium (1502);

interpreting of the authentication and the authorization information required by the physical medium (1503);

the digital medium generates the necessary proof (1504);

the generated proof is authenticated on the authenticating party's blockchain node (1505); and completion of the authentication and authorization (1506).

22. The blockchain and digital identity-based authenticated interaction method according to claim 15, wherein if the authenticated actor and the authenticating actor are a physical medium and a user, the method comprises following steps:

the physical medium and the user meet in the same medium (1600);

forwarding the authentication requirements and the blockchain data of the wireless communication module and/or the physical communication module in the physical medium to the user (1601);

navigating to the blockchain address transmitted by the physical medium via the user's mobile application (1602);

the blockchain node on the user's mobile device generates the required proof (1603);

forwarding the proof from the physical medium to the blockchain (4) node (1604); and completion of the authentication and authorization process (1605).

23. The blockchain and digital identity-based authenticated interaction method according to claim 15, wherein if the authenticated actor and the authenticating actor are a physical medium and a physical medium, the method comprises following steps:

the two physical mediums share the same environment (1700);

the party initiating the interaction takes on the authenticated role (1701); the authenticating actor communicates the authentication requirements to the party to be authenticated (1702);

the authenticated party generates the necessary proof through the digital identity blockchain node (1703);

authentication of the generated proof by the authenticating actor (1704); and completion of the authentication and authorization process (1705).

\* \* \* \* \*